United States Patent
Liu et al.

(10) Patent No.: US 10,349,379 B2
(45) Date of Patent: Jul. 9, 2019

(54) POSITIONING TAG REPLACEMENT METHOD AND POSITIONING SERVER

(71) Applicant: Huawei Technologies Co., Ltd., Shenzhen (CN)

(72) Inventors: Chao Liu, Shenzhen (CN); Shuguo Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/017,408

(22) Filed: Jun. 25, 2018

(65) Prior Publication Data

US 2018/0310275 A1 Oct. 25, 2018

Related U.S. Application Data

(63) Continuation of application No. PCT/CN2016/090514, filed on Jul. 19, 2016.

(30) Foreign Application Priority Data

Dec. 24, 2015 (CN) .......................... 2015 1 0988592

(51) Int. Cl.
  *G01S 5/00* (2006.01)
  *H04W 4/02* (2018.01)
  (Continued)

(52) U.S. Cl.
  CPC ......... *H04W 64/006* (2013.01); *H04W 4/023* (2013.01); *H04W 4/027* (2013.01);
  (Continued)

(58) Field of Classification Search
  CPC .. G06Q 10/087; G06Q 30/0255; G06Q 10/08; G06K 19/0723; G06K 7/10297;
  (Continued)

(56) References Cited

U.S. PATENT DOCUMENTS 6,317,724 B1    11/2001  Goodwin, III et al.
2003/0235172 A1*  12/2003  Wood .................... G01S 5/0284
                                                   370/338
(Continued)

FOREIGN PATENT DOCUMENTS

CN    102591915 A    7/2012
CN    103313194 A    9/2013
CN    104408500 A    3/2015

OTHER PUBLICATIONS

"Estimote SDK updated with accelerometer and temperature sensor support," XP055144895, Estimote blog, Apr. 2014, 6 pages.
(Continued)

*Primary Examiner* — Dung Hong
(74) *Attorney, Agent, or Firm* — Conley Rose, P.C.

(57) ABSTRACT

A positioning tag replacement method and a positioning server to implement replacement between positioning tags, where the method includes obtaining, by a positioning server, a moving trajectory of a first positioning tag and a moving trajectory of a second positioning tag, where the first positioning tag corresponds to a first positioned object, and the second positioning tag has no corresponding positioned object, and setting, by the positioning server, the second positioning tag to correspond to the first positioned object when the positioning server determines that the moving trajectory of the first positioning tag and the moving trajectory of the second positioning tag meet a preset condition. The method features low costs, simple and convenient operations, and easy implementation, and avoids that in an operation process, a positioned object escapes being monitored in a positioning system.

18 Claims, 3 Drawing Sheets

(51) Int. Cl.
*H04W 4/33* (2018.01)
*H04W 4/029* (2018.01)
*H04W 64/00* (2009.01)

(52) U.S. Cl.
CPC ............... *H04W 64/00* (2013.01); *G01S 5/00* (2013.01); *H04W 4/026* (2013.01); *H04W 4/029* (2018.02); *H04W 4/33* (2018.02)

(58) Field of Classification Search
CPC ........ G01S 19/13; G01S 5/0289; H04W 4/80; H04W 4/33
See application file for complete search history.

(56) References Cited

U.S. PATENT DOCUMENTS

| | | | | |
|---|---|---|---|---|
| 2005/0116823 | A1* | 6/2005 | Paulsen | G01S 5/06 340/539.13 |
| 2011/0195701 | A1* | 8/2011 | Cook | G01S 5/0018 455/422.1 |
| 2011/0199004 | A1 | 8/2011 | Henig et al. | |
| 2011/0315765 | A1* | 12/2011 | Schantz | G01S 13/751 235/385 |
| 2012/0126973 | A1* | 5/2012 | DeAngelis | A63B 24/0021 340/539.13 |
| 2015/0149837 | A1 | 5/2015 | Alonso et al. | |
| 2017/0337404 | A1* | 11/2017 | Rathus | G06K 7/10009 |

OTHER PUBLICATIONS

"How to replace your old Tile with the newer Tile," XP054978739, Youtube, Dec. 21, 2015, 1 page.
Foreign Communication From a Counterpart Application, European Application No. 16877283.8, Extended European Search Report dated Oct. 16, 2018, 10 pages.
Machine Translation and Abstract of Chinese Publication No. CN102591915, Jul. 18, 2012, 12 pages.
Machine Translation and Abstract of Chinese Publication No. CN103313194, Sep. 18, 2013, 14 pages.
Machine Translation and Abstract of Chinese Publication No. CN104408500, Mar. 11, 2015, 13 pages.
Foreign Communication From a Counterpart Application, PCT Application No. PCT/CN2016/090514, English Translation of International Search Report dated Sep. 30, 2016, 2 pages.
Foreign Communication From a Counterpart Application, PCT Application No. PCT/CN2016/090514, English Translation of Written Opinion dated Sep. 30, 2016, 5 pages.

* cited by examiner

POSITIONING TAG REPLACEMENT METHOD AND POSITIONING SERVER

CROSS-REFERENCE TO RELATED APPLICATIONS

This application is a continuation of International Patent Application No. PCT/CN2016/090514 filed on Jul. 19, 2016, which claims priority to Chinese Patent Application No. 201510988592.7 filed on Dec. 24, 2015. The disclosures of the aforementioned applications are hereby incorporated by reference in their entireties.

TECHNICAL FIELD

This application relates to the field of communications technologies, and in particular, to a positioning tag replacement method and a positioning server.

BACKGROUND

Indoor positioning means implementing location positioning in an indoor environment. In an indoor positioning system, a positioning tag is generally attached to a positioned object. The positioning tag is generally related to two pieces of information. One is an identifier carried by the positioning tag, and the identifier is used to represent a characteristic of the positioning tag, for example, used to indicate a physical address of the positioning tag, the other is configuration information, the configuration information is stored in a positioning server, and if the positioning tag has a corresponding positioned object, the configuration information is used to indicate information about the positioned object represented by the positioning tag.

The positioning tag is generally powered using a battery. When a battery of an old positioning tag is running out, and the old positioning tag needs to be replaced with a new positioning tag, a positioned object originally corresponding to the old positioning tag needs to be positioned using the new positioning tag in order to ensure continuous positioning of the positioned object.

A conventional method is using a terminal tool. First, the terminal tool notifies the positioning server that an operation of replacing the old positioning tag with the new positioning tag is to be performed. Then the terminal tool separately reads an identifier of the old positioning tag and an identifier of the new positioning tag, and reports the identifiers to the positioning server. The positioning server binds the positioned object corresponding to the old positioning tag to the new positioning tag, and finally replaces the old positioning tag with the new positioning tag. A disadvantage of the conventional method is that costs are increased because the identifiers of the new and old positioning tags need to be read and uploaded to the positioning server using the additional terminal tool. Moreover, only a person who has received professional training can complete a positioning tag replacement operation because the operation is quite complex.

Another conventional method is using a wireless communications technology. When the old positioning tag needs to be replaced with the new positioning tag, a wireless communications link is established between the new and old positioning tags to obtain identifiers of the new and old positioning tags. Finally, the corresponding identifiers of the positioning tags are uploaded to the positioning server to instruct the server to complete a positioning tag replacement task.

Disadvantages of the conventional method are described in two aspects.

Positioning tag replacement can be completed only when the new and old tags perform wireless communication. If a wireless communication manner used between the new and old tags is different from a wireless manner used by the indoor positioning system for positioning, an additional wireless communications system needs to be applied to the positioning tags, increasing costs and complexity of the positioning tags.

However, if a wireless communication manner that is the same as that used by the indoor positioning system for positioning is used, in a process of replacing the old positioning tag with the new positioning tag, the new and old positioning tags need to exit from a current wireless communications environment of the indoor positioning system, and join the positioning system again after the replacement is completed. During this time period, the positioned object is not being positioned and out of control in the positioning system.

SUMMARY

Embodiments of this application provide a positioning tag replacement method and a positioning server to provide a simple and reliable positioning tag replacement solution to avoid that in an operation process, a positioned object escapes being monitored in a positioning system.

In view of this, a first aspect of this application provides a positioning tag replacement method. The method includes, when a positioning server implements positioning of a first positioning tag and a second positioning tag, the positioning server obtains information about the first positioning tag and information about the second positioning tag, including moving trajectory information and an identifier. If the first positioning tag corresponds to a first positioned object, and the second positioning tag has no corresponding positioned object, after obtaining a moving trajectory of the first positioning tag, the positioning server stores the moving trajectory into the server as a moving trajectory of a positioned object. The positioning server determines, according to whether both the moving trajectory of the first positioning tag and a moving trajectory of the second positioning tag meet a preset moving trajectory, whether the moving trajectory of the first positioning tag and the moving trajectory of the second positioning tag meet a preset condition. If the moving trajectory of the first positioning tag and the moving trajectory of the second positioning tag meet the preset condition, the positioning server sets the second positioning tag to correspond to the first positioned object corresponding to the first positioning tag. The behavior is also referred to as that the second positioning tag replaces the first positioning tag, and in some feasible embodiments, may also be referred to as replacement between two positioning tags for short. It should be noted that there may be one or more first positioning tags and one or more second positioning tags, and positioning tag replacement implemented in this case is referred to as batch replacement between positioning tags.

In this application, the replacement between the two positioning tags needs to be implemented only according to the preset moving trajectory. Processing the process does not require a new terminal or a new wireless communications system, and modification needs to be performed only on the positioning server. Therefore, the method features low costs, simple and convenient operations, and easy implementation, and avoids that in an operation process, a positioned object escapes being monitored in a positioning system.

With reference to the first aspect of this application, in a first implementation of the first aspect of this application, the method includes that the positioning server separately classifies first positioning tags that have corresponding positioned objects and second positioning tags that have no corresponding positioned objects into several categories according to identifiers of the first positioning tags and the second positioning tags. If the positioning server determines that the first positioning tag and the second positioning tag belong to a same preset category, the positioning server determines that the first positioning tag can be replaced by the second positioning tag, or if the first positioning tag and the second positioning tag do not belong to a same preset category, the positioning server determines that the first positioning tag cannot be replaced by the second positioning tag.

Before implementing replacement, the positioning server first performs authentication on the identifiers of the positioning tags, that is, determines whether the first positioning tag, the second positioning tag, and a relationship between the first positioning tag and the second positioning tag have replacement qualifications, and positioning tag replacement can be performed only when a determining result is that the first positioning tag and the second positioning tag are qualified. Therefore, misoperation in a positioning tag replacement process is reduced, and theft of the configuration information corresponding to the positioning tag is also reduced, thereby enhancing security.

With reference to the first aspect of the embodiments of this application, in a second implementation of the first aspect of the embodiments of this application, the method includes the positioning server determines whether both the moving trajectory of the first positioning tag and the moving trajectory of the second positioning tag match a preset trajectory, where the preset moving trajectory may be one or more moving trajectories of some common shapes, lines, or characters, including a circle, an ellipse, a rectangle, a triangle, a figure 8, an English letter, or the like, and determines whether a distance between the first positioning tag and the second positioning tag meets a threshold. If both the moving trajectory of the first positioning tag and the moving trajectory of the second positioning tag match the preset trajectory, and the distance between the first positioning tag and the second positioning tag meets the threshold, the positioning server determines that the moving trajectory of the first positioning tag and the moving trajectory of the second positioning tag meet the preset condition, or if the moving trajectory of the first positioning tag or the moving trajectory of the second positioning tag or both do not match the preset trajectory, or the distance between the first positioning tag and the second positioning tag does not meet the threshold, the positioning server determines that the moving trajectory of the first positioning tag and the moving trajectory of the second positioning tag do not meet the preset condition.

The first positioning tag and the second positioning tag are placed together, and move simultaneously according to a specific moving trajectory within a specific time, and the positioning server implements the replacement between the two positioning tags by comparing the moving trajectories of the first positioning tag and the second positioning tag. Therefore, the method features a high level of real time, simple and convenient operations, and easy implementation.

A second aspect of this application provides a positioning server. When the positioning server implements positioning of a first positioning tag and a second positioning tag, an obtaining module obtains information about the first positioning tag and information about the second positioning tag, including moving trajectory information and an identifier. If the first positioning tag corresponds to a first positioned object, and the second positioning tag has no corresponding positioned object, after obtaining a moving trajectory of the first positioning tag, the obtaining module stores the moving trajectory into the server as a moving trajectory of a positioned object. A first determining module determines, according to whether both the moving trajectory of the first positioning tag and the moving trajectory of the second positioning tag meet a preset moving trajectory, whether the moving trajectory of the first positioning tag and the moving trajectory of the second positioning tag meet a preset condition. If the moving trajectory of the first positioning tag and the moving trajectory of the second positioning tag meet the preset condition, a configuration module sets the second positioning tag to correspond to the first positioned object corresponding to the first positioning tag such that the second positioning tag replaces the first positioning tag. There may be multiple first positioning tags and multiple second positioning tags in order to implement batch replacement.

In this application, the replacement between the two positioning tags needs to be implemented only according to the preset moving trajectory. Processing the process does not require a new terminal or a new wireless communications system, and modification needs to be performed only on the positioning server. Therefore, the method features low costs, simple and convenient operations, and easy implementation, and avoids that in an operation process, a positioned object escapes being monitored in a positioning system.

With reference to the second aspect of the embodiments of this application, in a first implementation of the second aspect of the embodiments of this application, a second determining module is configured to separately classify first positioning tags that have corresponding positioned objects and second positioning tags that have no corresponding positioned objects into several categories according to identifiers of the first positioning tags and the second positioning tags. If the positioning server determines that the first positioning tag and the second positioning tag belong to a same preset category, the positioning server determines that the first positioning tag can be replaced by the second positioning tag, or if the first positioning tag and the second positioning tag do not belong to a same preset category, the positioning server determines that the first positioning tag cannot be replaced by the second positioning tag.

Before implementing replacement, the second determining module first performs authentication on the identifiers of the positioning tags, that is, determines whether the first positioning tag, the second positioning tag, and a relationship between the first positioning tag and the second positioning tag have replacement qualifications, and positioning tag replacement can be performed only when a determining result is that the first positioning tag and the second positioning tag have replacement qualifications. Therefore, misoperation in a positioning tag replacement process is reduced, and theft of the configuration information corresponding to the positioning tag is also reduced, thereby enhancing security.

With reference to the second aspect of the embodiments of this application, in a second implementation of the second aspect of the embodiments of this application, the first determining module is further configured to determine whether both the moving trajectory of the first positioning tag and the moving trajectory of the second positioning tag match a preset trajectory, where the preset moving trajectory may be one or more moving trajectories of some common shapes, lines, or characters, including a circle, an ellipse, a rectangle, a triangle, a figure 8, an English letter, or the like, and determine whether a distance between the first positioning tag and the second positioning tag meets a threshold. If both the moving trajectory of the first positioning tag and the moving trajectory of the second positioning tag match the preset trajectory, and the distance between the first positioning tag and the second positioning tag meets the threshold, the first determining module determines that the moving trajectory of the first positioning tag and the moving trajectory of the second positioning tag meet the preset condition, or if the moving trajectory of the first positioning tag or the moving trajectory of the second positioning tag or both do not match the preset trajectory, or the distance between the first positioning tag and the second positioning tag does not meet the threshold, the first determining module determines that the moving trajectory of the first positioning tag and the moving trajectory of the second positioning tag do not meet the preset condition.

The first positioning tag and the second positioning tag are placed together, and move simultaneously according to a specific moving trajectory within a specific time, and the positioning server compares the moving trajectories of the first positioning tag and the second positioning tag such that the second positioning tag replaces the first positioning tag. Therefore, the method features a high level of real time, simple and convenient operations, and easy implementation.

A third aspect of this application provides a positioning server, including a communications interface, a memory, a processor, and a bus. The communications interface, the memory, and the processor are connected using the bus. The memory is configured to store a correspondence between a positioning tag and a positioned object. The processor is configured to obtain a moving trajectory of a first positioning tag and a moving trajectory of a second positioning tag using the communications interface, where the first positioning tag corresponds to a first positioned object, and the second positioning tag has no corresponding positioned object, and set the second positioning tag to correspond to the first positioned object when determining that the moving trajectory of the first positioning tag and the moving trajectory of the second positioning tag meet a preset condition. The memory is further configured to store the moving trajectory of the first positioning tag and the moving trajectory of the second positioning tag.

It may be learned from the foregoing technical solutions that the embodiments of this application have the following advantages.

In this application, it only needs to be determined whether the first positioning tag that has a corresponding positioned object and the second positioning tag that has no corresponding positioned object have moving trajectories meeting the preset condition, and then the second positioning tag can be set to correspond to the first positioned object corresponding to the first positioning tag such that the second positioning tag replaces the first positioning tag. Processing the process does not require a new terminal or a new wireless communications system, and modification needs to be performed only on the positioning server. Therefore, the method features low costs, simple and convenient operations, and easy implementation, and avoids that in an operation process, a positioned object escapes being monitored in a positioning system.

DESCRIPTION OF EMBODIMENTS

Embodiments of this application provide a positioning tag replacement method and a positioning server, to implement replacement between two positioning tags.

In the specification, claims, and accompanying drawings of this application, the terms "first," "second," "third," "fourth," and so on (if existent) are intended to distinguish between similar objects but do not necessarily indicate a specific order or sequence. It should be understood that the data termed in such a way is interchangeable in proper circumstances so that the embodiments described herein can be implemented in other orders than the order illustrated or described herein. Moreover, the terms "include," "have," and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

Figure 1:
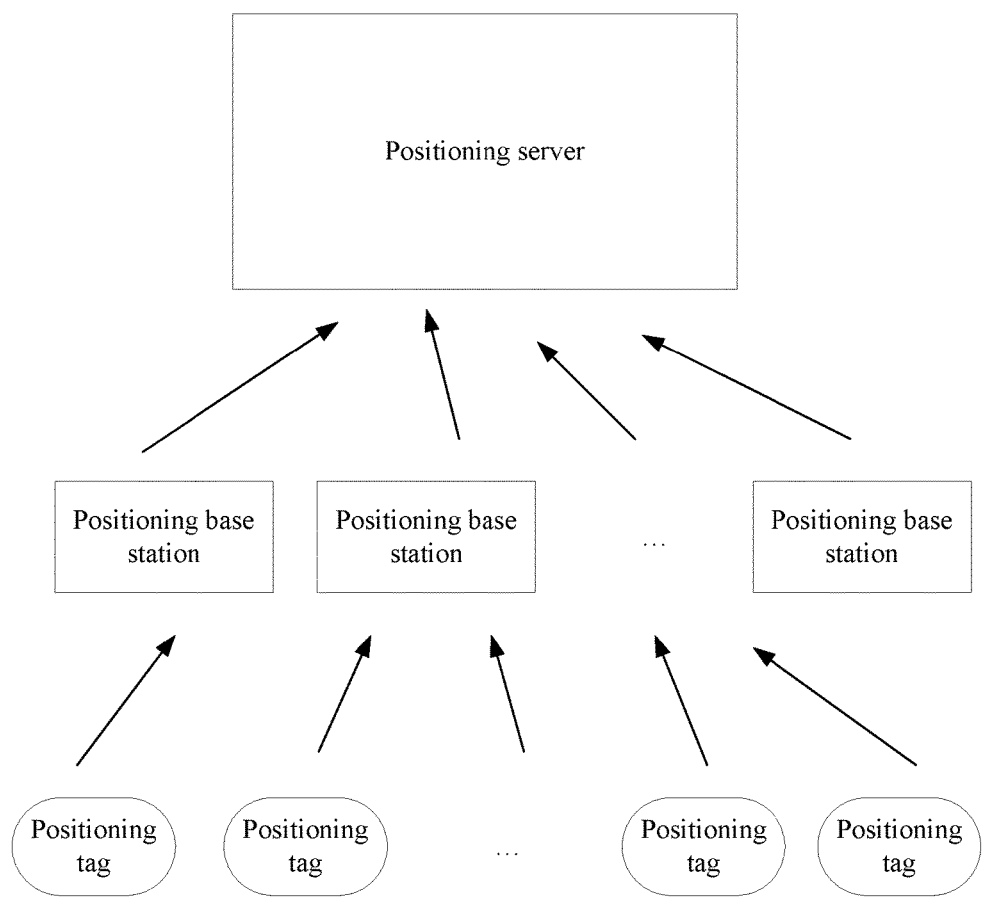
FIG. 1 is a schematic framework diagram of an indoor positioning system according to an embodiment of this application.

As shown in FIG. 1, FIG. 1 is a schematic architectural diagram of an indoor positioning system. A positioning tag, a positioning base station, and a positioning server form the indoor positioning system. In the indoor positioning system, the positioning tag is generally attached to a positioned object, and the positioning server positions the positioned object by positioning the positioning tag. The positioning tag implements communication with the positioning base station using a sensor and wireless communications module that are carried by the positioning tag, and the positioning base station may implement communication with the positioning server in a wireless or wired manner.

In the indoor positioning system, the positioning tag is generally attached to the positioned object. The positioning tag is generally related to two pieces of information. One is an identifier carried by the positioning tag, and the identifier is used to represent a characteristic of the positioning tag, for example, used to indicate a physical address of the positioning tag, the other is configuration information, the configuration information is stored in the positioning server, and if the positioning tag has a corresponding positioned object, the configuration information is used to indicate information about the positioned object represented by the positioning tag.

When a new positioning tag needs to be used to replace an old positioning tag for the positioned object, the positioned object originally corresponding to the old positioning tag needs to correspond to the new positioning tag in order to ensure continuous positioning of the positioned object.

A conventional manner is using an additional terminal tool to resolve the foregoing problem. The terminal tool notifies the positioning server that an operation of replacing the old positioning tag with the new positioning tag is to be performed, then separately reads identifiers of the new and old positioning tags, and reports the identifiers to the positioning server. The positioning server binds the configuration information to the new positioning tag. However, because a new terminal is needed in this method, extra costs may be increased, and an operation is quite complex.

Another method is using a wireless communications technology. When the old positioning tag needs to be replaced with the new positioning tag, a wireless communications link is established between the new and old positioning tags to obtain identifiers of the new and old positioning tags. Finally, the corresponding identifiers of the positioning tags are uploaded to the server, and the server completes a positioning tag replacement task.

If a wireless communication manner used between the new and old positioning tags is different from a wireless manner used by the indoor positioning system for positioning, an additional wireless communications system needs to be applied to the positioning tags, increasing costs and complexity of the positioning tags.

If a wireless communication manner that is the same as that used by the indoor positioning system for positioning is used, in a positioning tag replacement process, the new and old positioning tags need to exit from a current wireless communications environment of the positioning system, and join the positioning system again after positioning tag replacement is completed. During this time period, the positioned object is not being positioned and out of control in the positioning system.

However, in this application, it only needs to be determined whether the new and old positioning tags have moving trajectories meeting a preset condition, and then the old positioning tag can be replaced with the new positioning tag. Because a new terminal does not need to be used, and a new wireless communications system is not needed either, the method features low costs, simple and convenient operations, and easy implementation, and avoids that in an operation process, a positioned object escapes being monitored in a positioning system.

Therefore, a core idea of the embodiments of this application is to implement replacement between two positioning tags with replacement qualifications according to a preset moving trajectory. One positioning tag has a corresponding positioned object, and the other has no corresponding positioned object such that replacement between the positioning tags is implemented. The method features low costs, simple and convenient operations, and easy implementation during implementation of positioning tag replacement.

Figure 2:
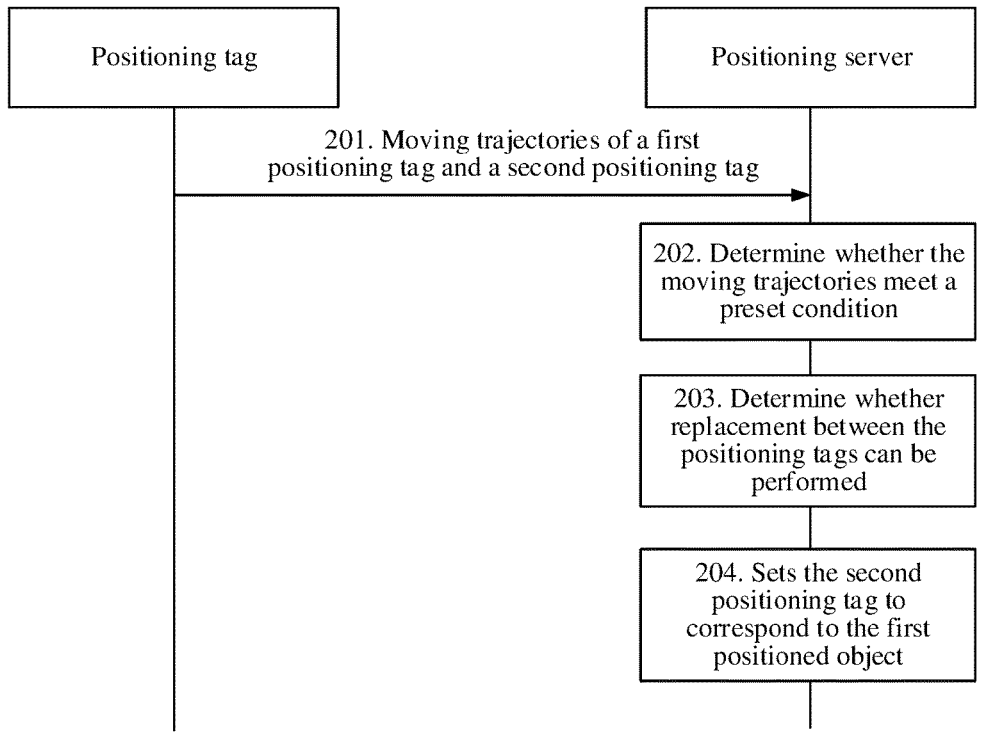
FIG. 2 is a schematic diagram of a positioning tag replacement method according to an embodiment of this application.

For ease of understanding, the following describes a specific process in an embodiment of this application. Referring to FIG. 2, an embodiment of a positioning tag replacement method according to an embodiment of this application includes the following steps.

Step 201. A positioning server obtains a moving trajectory of a first positioning tag and a moving trajectory of a second positioning tag, where the first positioning tag corresponds to a first positioned object, and the second positioning tag has no corresponding positioned object.

In some feasible embodiments, a positioning tag, a positioning base station, and the positioning server form an indoor positioning system. In the indoor positioning system, the positioning tag is generally attached to a positioned object. If it is considered on the side of the positioning server that the positioning tag corresponds to the positioned object, the positioning server positions the positioned object by positioning the positioning tag. The positioning tag implements communication with the positioning base station using a sensor and wireless communications module that are carried by the positioning tag, and the positioning base station may implement communication with the positioning server in a wireless or wired manner.

A sensor module and a wireless communications module are built in the positioning tag in this embodiment of this application.

The sensor module is mainly configured to obtain a spatial location, a movement status, a moving trajectory, and location and movement information of the positioning tag. The sensor module includes, but is not limited to, one or a combination of a geomagnetic sensor, an acceleration sensor, a gyroscope, a barometer, a gravity sensor, or a sensor manufactured using a basic principle the same as that of the foregoing sensor. This is not limited herein.

The wireless communications module includes one or a combination of multiple wireless communications manners such as a BLUETOOTH low energy (BLE), ZIGBEE, WI-FI, Long Term Evolution (LTE), radio frequency identification (RFID), Near Field Communication (NFC), infrared, and ultra-wideband (UWB). This is not limited herein. The wireless communications module is configured to send obtained information to the positioning base station such that the positioning tag communicates with the outside.

The positioning tag is generally related to two pieces of information, an identifier and configuration information. The positioning tag carries the identifier itself, the identifier includes a physical address, an identifier of each positioning tag is unique, and the positioning server determines a location of the positioning tag using the identifier of the positioning tag. The configuration information is stored on the positioning server, and is used to indicate information, including a moving trajectory, about the positioned object corresponding to the positioning tag. On the positioning server, the configuration information corresponding to the positioning tag, that is, information representing the positioned object corresponding to the positioning tag, includes a location and the moving trajectory, or may include an item category of the positioned object, or the like. This is not limited herein.

After the positioning server obtains the identifier of the positioning tag, once the identifier corresponds to the configuration information, it may be considered that the positioning tag correspondingly has the positioned object represented by the configuration information. That is, in the indoor positioning system, the positioning server determines location information of the positioned object by determining the location of the positioning tag, and stores latest information about positioning of the positioning tag into corresponding configuration information, thereby implementing positioning of the positioned object. However, when the configuration information and the identifier are unbound, it may be considered that a correspondence between the positioning tag and the positioned object is canceled.

In this embodiment of this application, when the positioning server implements positioning of the first positioning tag and the second positioning tag, the positioning server obtains information about the first positioning tag and information about the second positioning tag, including a moving trajectory and an identifier. Because the first positioning tag has a corresponding positioned object, and the second positioning tag has no corresponding positioned object, after obtaining the moving trajectory of the first positioning tag, the positioning server may store the moving trajectory in the server as a moving trajectory of the positioned object, that is, configuration information of the first positioning tag. After obtaining the moving trajectory of the second positioning tag, the positioning server may temporarily store the moving trajectory in the positioning server, or may store the moving trajectory for a long time. This is not limited herein.

Step 202. The positioning server determines whether the moving trajectory of the first positioning tag and the moving trajectory of the second positioning tag meet a preset condition.

In this embodiment of this application, implementing positioning tag replacement by determining whether the moving trajectory of the first positioning tag and the moving trajectory of the second positioning tag meet the preset condition is a core of this application. In this embodiment, that the positioning server determines whether the moving trajectory of the first positioning tag and the moving trajectory of the second positioning tag meet the preset condition may be implemented by determining whether both the moving trajectory of the first positioning tag and the moving trajectory of the second positioning tag meet a preset moving trajectory. To implement replacement between the positioning tags, the condition preset by the positioning server may be different moving trajectories. When the moving trajectories of both the first positioning tag and the second positioning tag can meet the preset moving trajectory, it may be considered that the moving trajectories of both the first positioning tag and the second positioning tag meet the preset condition. In some feasible embodiments, the preset moving trajectory may be one or more moving trajectories of some common shapes, lines, or characters, including a circle, an ellipse, a rectangle, a triangle, a figure 8, an English letter, or the like. This is not limited herein. In some feasible embodiments, the positioning server may modify the preset moving trajectory according to needs.

In some embodiments, the moving trajectory of the first positioning tag that has a corresponding positioned object may be stored in the configuration information of the first positioning tag in the server such that the positioning server implements positioning of the positioned object. The moving trajectory of the second positioning tag that has no corresponding positioned object may be temporarily stored in the server. Because the second positioning tag has no positioned object, the temporarily stored moving trajectory may be deleted by the positioning server after being stored for a period of time in order to save storage space. When needing the moving trajectory, the positioning server may obtain the moving trajectory from the temporarily stored information.

In some feasible embodiments, that the positioning server determines whether the moving trajectory of the first positioning tag and the moving trajectory of the second positioning tag meet the preset condition may be implemented by determining whether the moving trajectory of the first positioning tag and the moving trajectory of the second positioning tag are consistent at each time point during a time period. Whether moving directions of the first positioning tag and the second positioning tag are consistent enough, and whether the first positioning tag and the second positioning tag are close enough in distance, that is, whether a difference between the moving directions of the first positioning tag and the second positioning tag falls within a preset range, and whether a distance between the first positioning tag and the second positioning tag falls within a preset range are determined. When an answer at each time point is yes, it is considered that the moving trajectories of the first positioning tag and the second positioning tag are consistent.

In this embodiment of this application, the preset condition may be one or a combination of the foregoing two conditions. This is not limited herein. In some feasible embodiments, the moving trajectory includes time and space, and determining whether the moving trajectories of the first positioning tag and the second positioning tag are consistent may be considered as determining within a same time period.

In some feasible embodiments, if both the moving trajectory of the first positioning tag and the moving trajectory of the second positioning tag match the preset trajectory, and that the distance between the first positioning tag and the second positioning tag meets a threshold, the positioning server determines that the moving trajectory of the first positioning tag and the moving trajectory of the second positioning tag meet the preset condition, or if the moving trajectory of the first positioning tag or the moving trajectory of the second positioning tag or both do not match a preset trajectory, or that the distance between the first positioning tag and the second positioning tag does not meet a threshold, the positioning server determines that the moving trajectory of the first positioning tag and the moving trajectory of the second positioning tag do not meet the preset condition.

Alternatively, determining may be performed in reverse. That is, if both the moving trajectory of the first positioning tag and the moving trajectory of the second positioning tag match the preset trajectory, and that the distance between the first positioning tag and the second positioning tag meets a threshold, the positioning server determines that the moving trajectory of the first positioning tag and the moving trajectory of the second positioning tag do not meet the preset condition, or if the moving trajectory of the first positioning tag or the moving trajectory of the second positioning tag or both do not match the preset trajectory, or that the distance between the first positioning tag and the second positioning tag does not meet a threshold, the positioning server determines that the moving trajectory of the first positioning tag and the moving trajectory of the second positioning tag meet the preset condition. This is not limited herein. In this embodiment of this application, the foregoing first implementation is used as an example for description, that is, when both the moving trajectory of the first positioning tag and the moving trajectory of the second positioning tag match the preset trajectory, and that the distance between the first positioning tag and the second positioning tag meets the threshold, the positioning server determines that the moving trajectory of the first positioning tag and the moving trajectory of the second positioning tag meet the preset condition.

In other feasible embodiments, the preset condition may be that the first positioning tag and the second positioning tag move simultaneously in opposite directions, or may be that the first positioning tag and the second positioning tag move simultaneously to a same direction at a same speed. This is not limited herein. However, in this application, the foregoing implementation is used as an example for description.

In this embodiment of this application, the first positioning tag and the second positioning tag are placed together, and move simultaneously according to a specific moving trajectory within a specific time, and by comparing the moving trajectories of the first positioning tag and the second positioning tag, the positioning server sets the second positioning tag to correspond to the positioned object corresponding to the first positioning tag. Therefore, the method features a high level of real time, simple and convenient operations, and easy implementation.

Step 203. The positioning server determines whether the first positioning tag can be replaced by the second positioning tag.

In this embodiment, for security of a replacement process, before performing replacement between the positioning tags, the positioning server may further determine whether the first positioning tag and the second positioning tag have replacement qualifications. A specific implementation may include separately performing authentication on an identifier of the first positioning tag and an identifier of the second positioning tag, or may include performing authentication on a relationship between the two positioning tags using an identifier of the first positioning tag and an identifier of the second positioning tag. This is not limited herein. In this embodiment of this application, performing authentication by determining whether the first positioning tag and the second positioning tag belong to a same preset category may be used as an example for description.

Authentication is performed on the first positioning tag and the second positioning tag in the following manner.

The positioning server classifies positioning tags that have corresponding positioned objects into categories a, b, c, and d according to identifiers of positioning tags. For example, the category a is a computer, and the category b is a printer. This is not limited herein. An identifier of a positioning tag may have or may not have a part that represents a category of a positioned object corresponding to the positioning tag. This is not limited herein. Each category has multiple positioning tags: a1, a2, a3, . . . , and an; b1, b2, b3, . . . , and bn; c1, c2, c3, . . . , and cn; and d1, d2, d3, . . . , and dn. The positioning tags that have no corresponding positioned objects are also correspondingly classified into categories, A, B, C, and D. Each category has multiple positioning tags: A1, A2, A3, . . . , and An; B1, B2, B3, . . . , and Bn; C1, C2, C3, . . . , and Cn; and D1, D2, D3, . . . , and Dn.

The positioning server may make following rules. That is, any positioning tag in the positioning tags of the category A may replace any positioning tag in the positioning tags of the category a, any positioning tag in the positioning tags of the category B may replace any positioning tag in the positioning tags of the category b, any positioning tag in the positioning tags of the category C may replace any positioning tag in the positioning tags of the category c, and any positioning tag in the positioning tags of the category D may replace any positioning tag in the positioning tags of the category d.

In this embodiment of this application, if the positioning server determines that the first positioning tag and the second positioning tag belong to a same preset category, the positioning server determines that the first positioning tag can be replaced by the second positioning tag, or if the positioning server determines that the first positioning tag and the second positioning tag do not belong to a same preset category, the positioning server determines that the first positioning tag cannot be replaced by the second positioning tag.

In this solution, performing authentication herein by determining whether the two positioning tags belong to a same preset category is used as an example for description. Alternatively, in other feasible embodiments, classification may not be performed. Instead, authentication is performed separately on the two positioning tags, without determining the relationship between the two positioning tags. Provided that both the two positioning tags have replacement qualifications, it may be considered that the two positioning tags have the replacement qualifications. Provided that a manner can be used to determine, by determining an identifier of a positioning tag, whether the positioning tag has a positioning tag replacement qualification, no limitation is imposed herein.

It should be particularly noted that there is no time sequence relationship between step 203 and step 202. That is, step 203 may occur before step 202, or may occur after step 202. This is not limited herein.

In this embodiment of this application, before implementing replacement, the positioning server first performs authentication on the identifiers of the positioning tags, that is, determines whether the first positioning tag and the second positioning tag have the replacement qualifications, and a positioning tag replacement operation can be performed only when a determining result is that the first positioning tag and the second positioning tag are qualified. Therefore, misoperation in a positioning tag replacement process is reduced, and theft of the configuration information corresponding to the positioning tag is also reduced, thereby enhancing security.

Step 204. The positioning server sets the second positioning tag to correspond to the first positioned object.

In some feasible embodiments related to the indoor positioning system, a positioned object originally corresponding to an old positioning tag needs to correspond to a new positioning tag in order to ensure continuous positioning of the positioned object. For example, the positioning tag is generally powered using a battery, and when a battery of the old positioning tag is running out, the old positioning tag needs to be replaced with the new positioning tag. The old positioning tag is a positioning tag that has a corresponding positioned object, and the new positioning tag is a positioning tag that has no corresponding positioned object. In this embodiment of this application, when two positioning tags are authenticated, provided that one positioning tag has a corresponding positioned object, and the other has no corresponding positioned object, positioning tag replacement in this embodiment of this application can be implemented.

When determining that the moving trajectory of the first positioning tag and the moving trajectory of the second positioning tag meet the preset condition, the server sets the second positioning tag that originally has no corresponding positioned object to correspond to the positioned object corresponding to the first positioning tag, that is, the first positioning tag is replaced with the second positioning tag. That is, the old positioning tag is replaced with the new positioning tag in the foregoing description.

In some feasible embodiments, the first positioning tag and the second positioning tag each may be one or more positioning tags, and it is still possible to implement positioning tag replacement, which is referred to as batch replacement. The following provides a detailed description.

When there is one first positioning tag corresponding to the first positioned object, and there are multiple second positioning tags that have no corresponding positioned objects, after the positioning tag replacement is implemented, the positioning server may configure that all the multiple second positioning tags correspond to the first positioned object.

When there are multiple first positioning tags that all correspond to the first positioned object, and there is one second positioning tag that has no corresponding positioned object, after the positioning tag replacement is implemented, the positioning server sets the second positioning tag to correspond to the first positioned object.

When there are multiple first positioning tags that all correspond to the first positioned object, and there are multiple second positioning tags that have no corresponding positioned objects, after the positioning tag replacement is implemented, the positioning server sets all the second positioning tags to correspond to the first positioned object.

It should be noted that if two or more positioning tags that have different corresponding positioned objects exist in first positioning tags that have corresponding positioned objects and that participate in a positioning tag batch replacement operation, it is not allowed to complete the positioning tag replacement operation.

In addition, it should be noted that, in this embodiment of this application, replacement between the positioning tags can be performed only when the positioning server determines that the first positioning tag and the second positioning tag have the replacement qualifications, and determines that the moving trajectory of the first positioning tag and the moving trajectory of the second positioning tag meet the preset condition. Alternatively, in other feasible embodiments, it may only need to be determined that the moving trajectory of the first positioning tag and the moving trajectory of the second positioning tag meet the preset condition. This is not limited herein.

Optionally, in some feasible embodiments, after the second positioning tag that has no positioned object corresponds to the first positioned object, a correspondence between the first positioning tag and the first positioned object may be canceled. Alternatively, in some feasible embodiments, if the first positioning tag or the second positioning tag is one or more positioning tags, correspondences between all tags in the first positioning tag and the first positioned object may be canceled after all tags in the second positioning tag correspond to the first positioned object. The correspondence between the first positioning tag and the first positioned object is canceled, and the positioned object is completely positioned using the second positioning tag such that the first positioning tag may be used to position a new positioned object. The method is simple and easy to understand, resulting in good user experience.

In this embodiment of this application, the positioning server only needs to determine whether the first positioning tag and the second positioning tag have the moving trajectories meeting the preset condition, and then the second positioning tag can replace the first positioning tag. Processing the process does not require a new terminal or a new wireless communications system, and modification needs to be performed only on the positioning server. Therefore, the method features low costs, simple and convenient operations, and easy implementation, and avoids that in an operation process, a positioned object escapes being monitored in a positioning system.

The foregoing describes the positioning tag replacement method in the embodiments of this application, and the following describes a positioning server in the embodiments of this application.

Figure 3:
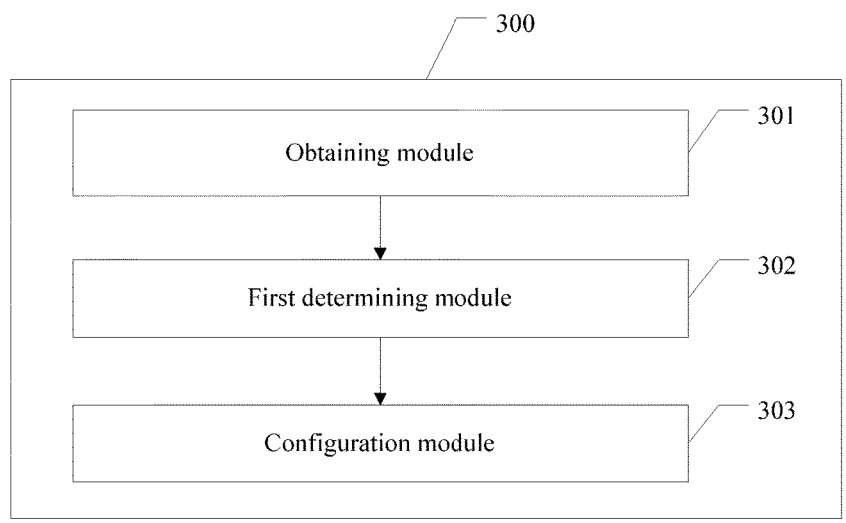
FIG. 3 is a schematic diagram of a positioning server according to an embodiment of this application.

Referring to FIG. 3, an embodiment of this application further provides a positioning server 300. The positioning server includes the following modules.

An obtaining module 301 is configured to obtain a moving trajectory of a first positioning tag and a moving trajectory of a second positioning tag, where the first positioning tag corresponds to a first positioned object, and the second positioning tag has no corresponding positioned object.

A first determining module 302 is configured to determine whether the moving trajectory of the first positioning tag and the moving trajectory of the second positioning tag that are obtained by the obtaining module 301 meet a preset condition.

Further, the first determining module 302 is further configured to determine whether the moving trajectory of the first positioning tag and the moving trajectory of the second positioning tag match a preset trajectory, and whether a distance between the first positioning tag and the second positioning tag meets a threshold, and when determining that both the moving trajectory of the first positioning tag and the moving trajectory of the second positioning tag match the preset trajectory, and that the distance between the first positioning tag and the second positioning tag meets the threshold, determine that the moving trajectory of the first positioning tag and the moving trajectory of the second positioning tag meet the preset condition.

A configuration module 303 is configured to set the second positioning tag to correspond to the first positioned object if the first determining module 302 determines that the moving trajectory of the first positioning tag and the moving trajectory of the second positioning tag that are obtained by the obtaining module 301 meet the preset condition.

Figure 4:
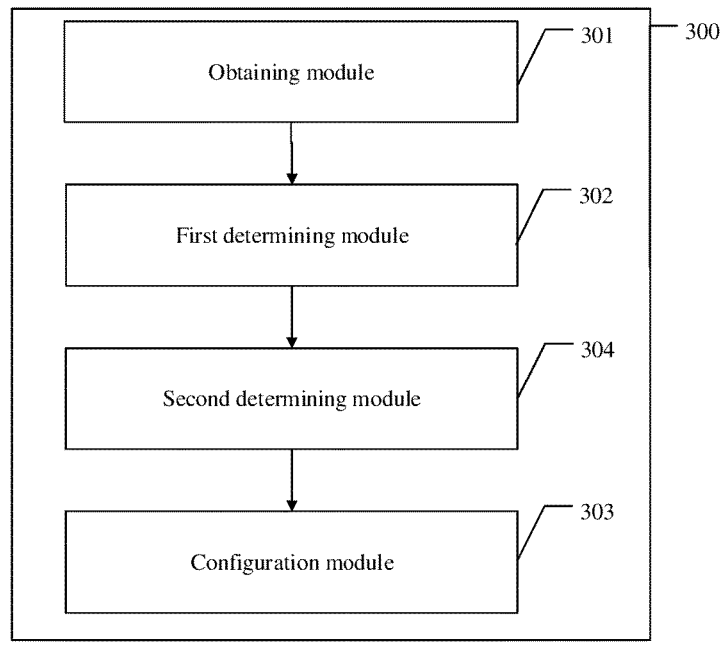
FIG. 4 is a schematic diagram of another positioning server according to an embodiment of this application.

Referring to FIG. 4, in some embodiments of the present disclosure, the positioning server 300 further includes a second determining module 304 configured to determine, according to an identifier of the first positioning tag and an identifier of the second positioning tag, whether the first positioning tag can be replaced by the second positioning tag.

The second determining module 304 is further configured to determine whether the first positioning tag and the second positioning tag belong to a same preset category, and after determining that the first positioning tag and the second positioning tag belong to the same preset category, determine that the first positioning tag can be replaced by the second positioning tag.

In this embodiment of this application, the first determining module 302 only needs to determine whether the first positioning tag and the second positioning tag that are obtained by the obtaining module 301 have the moving trajectories meeting the preset condition, and then the configuration module 303 can set the second positioning tag to correspond to the first positioned object, where the first positioning tag corresponds to the first positioned object, and the second positioning tag has no corresponding positioned object. Processing the process does not require a new terminal or a new wireless communications system, and modification needs to be performed only on the positioning server. Therefore, the method features low costs, simple and convenient operations, and easy implementation, and avoids that in an operation process, a positioned object escapes being monitored in a positioning system.

Figure 5:
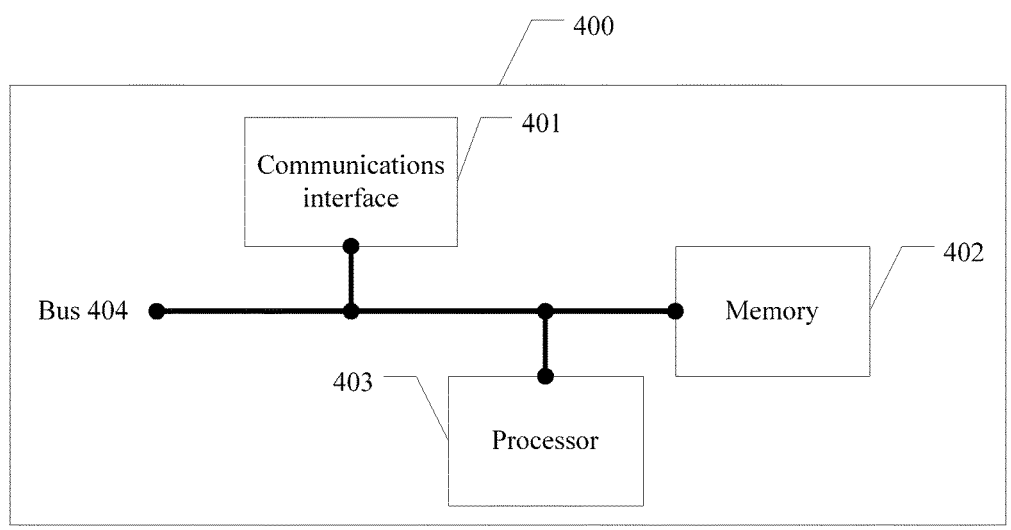
FIG. 5 is a schematic diagram of still another positioning server according to an embodiment of this application.

The foregoing describes a positioning server in the embodiments of this application from a perspective of a modular functional entity, and the following describes the positioning server in the embodiments of this application from a perspective of hardware processing. Referring to FIG. 5, an embodiment of this application provides a positioning server 400 configured to implement replacement between positioning tags.

The positioning server 400 includes a communications interface 401, a memory 402, a processor 403, and a bus 404.

The communications interface 401, the memory 402, and the processor 403 are connected using the bus 404.

The communications interface 401 is configured to obtain a moving trajectory of a first positioning tag and a moving trajectory of a second positioning tag.

The communications interface 401 may include a communications interface between the processor 403 and a standard communications subsystem.

The communications interface 401 may further include a communications interface of an EIA-RS-232C standard, that is, a communications interface between data terminal equipment (DTE) and data circuit-terminating equipment (DCE)

of a serial binary data exchange interface technical standard, or may include a communications interface of an RS-485 protocol. This is not limited herein.

The memory 402 stores a correspondence between a positioning tag and a positioned object.

The memory 402 may include a volatile memory, for example, a random access memory (RAM). Alternatively, the memory 402 may include a non-volatile memory, for example, a flash memory, a hard disk drive (HDD), or a solid-state drive (SSD). Alternatively, the memory 402 may include a combination of the foregoing types of memories. This is not limited herein.

Optionally, the memory 402 may further be configured to store a program instruction. The processor 403 may invoke the program instruction stored in the memory 402 to perform one or more steps in the embodiment shown in FIG. 2, or an optional implementation in the embodiment shown in FIG. 2 such that the positioning server 400 implements functions of the foregoing method.

The processor 403 is configured to obtain the moving trajectory of the first positioning tag and the moving trajectory of the second positioning tag using the communications interface 401, where the first positioning tag corresponds to a first positioned object, and the second positioning tag has no corresponding positioned object, and set the second positioning tag to correspond to the first positioned object when determining that the moving trajectory of the first positioning tag and the moving trajectory of the second positioning tag meet a preset condition.

The processor 403 may be a central processing unit (CPU), a network processor (NP), or a combination of a CPU and an NP.

The processor 403 may further include a hardware chip. The foregoing hardware chip may be an application-specific integrated circuit (ASIC), a programmable logic device (PLD), or a combination thereof. The foregoing PLD may be a complex programmable logic device (CPLD), a field programmable gate array (FPGA), a generic array logic (GAL), or any combination thereof.

The memory 402 is further configured to store the moving trajectory of the first positioning tag and the moving trajectory of the second positioning tag.

In this application, it only needs to be determined whether the first positioning tag that has a corresponding positioned object and the second positioning tag that has no corresponding positioned object have moving trajectories meeting the preset condition, and then the second positioning tag can be set to correspond to the first positioned object corresponding to the first positioning tag such that the second positioning tag replaces the first positioning tag. Processing the process does not require a new terminal or a new wireless communications system, and modification needs to be performed only on the positioning server. Therefore, the method features low costs, simple and convenient operations, and easy implementation, and avoids that in an operation process, a positioned object escapes being monitored in a positioning system.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a RAM, a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A positioning tag replacement method, comprising:
obtaining, by a positioning server, a first moving trajectory of a first positioning tag corresponding to a first positioned object and a second moving trajectory of a second positioning tag having no corresponding positioned object; and
setting, by the positioning server, the second positioning tag to correspond to the first positioned object in response to the positioning server determining that the first moving trajectory and the second moving trajectory meet a preset condition, the positioning server determining that the first moving trajectory and the second moving trajectory meet the preset condition by the positioning server determining that both the first moving trajectory and the second moving trajectory match a preset moving trajectory and that a distance between the first positioning tag and the second positioning tag meets a threshold.

2. The positioning tag replacement method of claim 1, wherein setting the second positioning tag to correspond to the first positioned object comprises setting, by the positioning server, the second positioning tag to correspond to the first positioned object in response to the positioning server determining, according to a first identifier of the first positioning tag and a second identifier of the second positioning tag, that the first positioning tag can be replaced by the second positioning tag.

3. The positioning tag replacement method of claim 2, wherein determining that the first positioning tag can be replaced by the second positioning tag comprises determining, by the positioning server, that the first positioning tag can be replaced by the second positioning tag in response to the positioning server determining, according to the first identifier and the second identifier, that the first positioning tag and the second positioning tag belong to a same preset category.

4. The positioning tag replacement method of claim 2, further comprising determining, by the positioning server, that the first positioning tag cannot be replaced by the second positioning tag in response to the positioning server determining, according to the first identifier and the second identifier, that the first positioning tag and the second positioning tag do not belong to a same preset category.

5. The positioning tag replacement method of claim 2, wherein the first positioning tag is attached to the first positioned object, the first identifier indicating a first physical address of the first positioning tag, the first positioning tag corresponding to first configuration information stored on the positioning server, the first configuration information indicating information of the first positioned object, and the information of the first positioned object comprising a first location and the first moving trajectory.

6. The positioning tag replacement method of claim 1, further comprising cancelling, by the positioning server, a correspondence between the first positioning tag and the first positioned object after setting the second positioning tag to correspond to the first positioned object.

7. The positioning tag replacement method of claim 1, wherein a pattern of the preset moving trajectory comprises a circle, an ellipse, a rectangle, a triangle, a figure eight, or an English letter.

8. A positioning server, comprising:
a communications interface;
a memory coupled to the communications interface using a bus and configured to store a correspondence between a positioning tag and a positioned object; and
a processor coupled to the communications interface and the memory using the bus acid configured to:
obtain a first moving trajectory of a first positioning tag corresponding to a first positioned object and a second moving trajectory of a second positioning tag having no corresponding positioned object;
set the second positioning tag to correspond to the first positioned object when the first moving trajectory and the second moving trajectory meet a preset condition; and
determine that the first moving trajectory and the second moving trajectory meet the preset condition when both the first moving trajectory and the second moving trajectory match a preset moving trajectory and a distance between the first positioning tag and the second positioning tag meets a threshold, and the memory being further configured to store the first moving trajectory and the second moving trajectory.

9. The positioning server of claim 8, wherein the processor is further configured to set the second positioning tag to correspond to the first positioned object when determining, according to a first identifier of the first positioning tag and a second identifier of the second positioning tag, that the first positioning tag can be replaced by the second positioning tag.

10. The positioning server of claim 9, wherein the processor is further configured to determine that the first positioning tag can be replaced by the second positioning tag when determining, according to the first identifier and the second identifier, that the first positioning tag and the second positioning tag belong to a same preset category.

11. The positioning server of claim 9, wherein the processor is further configured to determine that the first positioning tag cannot be replaced by the second positioning tag when determining, according to the first identifier and the second identifier, that the first positioning tag and the second positioning tag do not belong to a same preset category.

12. The positioning server of claim 9, wherein the first positioning tag is attached to the first positioned object, the first identifier indicating a first physical address of the first positioning tag, the first positioning tag corresponding to first configuration information stored on the positioning server, the first configuration information indicating information of the first positioned object, and the information of the first positioned object comprising a first location and the first moving trajectory.

13. The positioning server of claim 8, wherein the processor is further configured to cancel a correspondence between the first positioning tag and the first positioned object after setting the second positioning tag to correspond to the first positioned object.

14. An indoor positioning system, comprising:
a first positioned object;
a first positioning tag coupled to the first positioned object; and
a positioning server coupled to the first positioned object and the first positioning tag, and comprising:
a memory comprising instructions; and
a processor coupled to the memory, the instructions causing the processor to be configured to:
obtain a first moving trajectory of the first positioning tag corresponding to the first positioned object and a second moving trajectory of a second positioning tag having no corresponding positioned object, using a communications interface; and
set the second positioning tag to correspond to the first positioned object when the first moving trajectory and the second moving trajectory meet a preset condition, the positioning server determining that the first moving trajectory and the second moving trajectory meet the preset condition by the positioning server determining that both the first moving trajectory and the second moving trajectory match a preset moving trajectory and that a distance between the first positioning tag and the second positioning tag meets a threshold, and
the first positioning tag comprising:
a sensor configured to obtain the first moving trajectory of the first positioning tag; and
a wireless communications circuit configured to communicate with the positioning server.

15. The indoor positioning system of claim 14, wherein the instructions further cause the processor to be configured to set the second positioning tag to correspond to the first positioned object when determining, according to a first identifier of the first positioning tag and a second identifier of the second positioning tag, that the first positioning tag can be replaced by the second positioning tag.

16. The indoor positioning system of claim 15, wherein the instructions further cause the processor to be configured to determine that the first positioning tag can be replaced by the second positioning tag when determining, according to the first identifier and the second identifier, that the first positioning tag and the second positioning tag belong to a same preset category.

17. The indoor positioning system of claim 15, wherein the instructions further cause the processor to be configured to determine that the first positioning tag cannot be replaced by the second positioning tag when determining, according to the first identifier and the second identifier, that the first positioning tag and the second positioning tag do not belong to a same preset category.

18. The indoor positioning system of claim 14, wherein the instructions further cause the processor to be configured to cancel a correspondence between the first positioning tag and the first positioned object after setting the second positioning tag to correspond to the first positioned object.

* * * * *

UNITED STATES PATENT AND TRADEMARK OFFICE
CERTIFICATE OF CORRECTION

PATENT NO. : 10,349,379 B2
APPLICATION NO. : 16/017408
DATED : July 9, 2019
INVENTOR(S) : Chao Liu and Shuguo Zhou Page 1 of 1

It is certified that error appears in the above-identified patent and that said Letters Patent is hereby corrected as shown below:

In the Claims

Claim 8, Column 17, Line 53, should read: "the memory using the bus and configured to:"

Signed and Sealed this
Third Day of September, 2019

Andrei Iancu
*Director of the United States Patent and Trademark Office*